US011989202B2

(12) United States Patent
Magallanes et al.

(10) Patent No.: US 11,989,202 B2
(45) Date of Patent: May 21, 2024

(54) REALTIME VIEWER IN CLOUD STORAGE ENVIRONMENTS

(71) Applicant: INTERNATIONAL BUSINESS MACHINES CORPORATION, Armonk, NY (US)

(72) Inventors: Veronica Gutierrez Magallanes, Zapopan (MX); Guillermo Balandran Tellez, Zapopan (MX); Carolina Garcia Delgado, Zapopan (MX); Cesar Augusto Rodriguez Bravo, Alajuela (CR)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 17/456,005

(22) Filed: Nov. 22, 2021

(65) Prior Publication Data

US 2023/0161789 A1   May 25, 2023

(51) Int. Cl.
*G06F 16/26*   (2019.01)
*G06F 3/0481*   (2022.01)
*G06F 3/16*   (2006.01)

(52) U.S. Cl.
CPC ............ *G06F 16/26* (2019.01); *G06F 3/0481* (2013.01); *G06F 3/167* (2013.01)

(58) Field of Classification Search
CPC ... G06F 40/106; G06F 16/168; G06F 3/04812
(Continued)

(56) References Cited

U.S. PATENT DOCUMENTS 6,028,604 A * 2/2000 Matthews, III ....... G06F 3/0481
715/821
7,596,766 B1 * 9/2009 Sharma ................. G06F 3/0481
715/713
(Continued)

FOREIGN PATENT DOCUMENTS

CN   102566851 A   7/2012
CN   102955653 B   8/2016
(Continued)

OTHER PUBLICATIONS

Andersson et al., "A study in how to inject steganographic data into videos in a sturdy and non-intrusive manner", KTH Royal Institute of Technology, School of Engineering Sciences in Chemistry, Biotechnology and Health, Degree project in Computer Engineering, First Cycle, 15 credits, Stockholm, Sweden 2019, pp. 1-74.
(Continued)

*Primary Examiner* — Patrick F Riegler
(74) *Attorney, Agent, or Firm* — Steven M. Bouknight

(57) ABSTRACT

A method, a computer program product, and a computer system generate a realtime viewer of content in a user interface for cloud storage environments. The method includes receiving an input selecting a data unit stored with a cloud storage service. The method includes transmitting a sensory representation to a user device. The sensory representation is shown on the user interface of the user device. The sensory representation is generated prior to the input is received. The sensory representation is output to a user utilizing the user device such that the user is capable of ascertaining a content of the data unit without the user requesting the data unit.

14 Claims, 7 Drawing Sheets

(58) Field of Classification Search
USPC .................................................. 715/711, 708
See application file for complete search history.

(56) References Cited

U.S. PATENT DOCUMENTS

| | | | |
|---|---|---|---|
| 8,732,600 | B2 | 5/2014 | Robert |
| 9,063,912 | B2 | 6/2015 | Seibert, Jr. |
| 9,501,178 | B1* | 11/2016 | Cassezza ................ G06F 3/041 |
| 10,958,732 | B1* | 3/2021 | Procopio ................ H04L 67/10 |
| 2004/0095371 | A1* | 5/2004 | Haynes ................ G06F 3/0481 |
| | | | 715/711 |
| 2007/0233740 | A1* | 10/2007 | Nichols ................... G06F 16/48 |
| 2009/0084249 | A1* | 4/2009 | Kemp ..................... G06F 16/64 |
| | | | 84/609 |
| 2009/0254345 | A1* | 10/2009 | Fleizach ............... G06F 40/205 |
| | | | 704/260 |
| 2011/0234480 | A1* | 9/2011 | Fino ..................... G11B 27/105 |
| | | | 345/156 |
| 2012/0084688 | A1* | 4/2012 | Robert .................. G06F 3/0486 |
| | | | 715/788 |
| 2012/0117468 | A1* | 5/2012 | Ragan ................. G06F 3/04817 |
| | | | 715/273 |
| 2012/0290614 | A1* | 11/2012 | Nandakumar ........ G06F 16/951 |
| | | | 707/E17.014 |
| 2013/0198600 | A1 | 8/2013 | Lockhart |
| 2013/0311557 | A1 | 11/2013 | Aston |
| 2015/0100578 | A1 | 4/2015 | Rosen |
| 2015/0186478 | A1* | 7/2015 | Yan .................... G06F 16/24578 |
| | | | 707/722 |
| 2015/0339307 | A1* | 11/2015 | Hultgren ............. G06F 16/2246 |
| | | | 707/724 |
| 2017/0039168 | A1* | 2/2017 | Hassan .................. G06Q 10/10 |
| 2017/0075540 | A1* | 3/2017 | Hausler ............... G06F 16/2477 |
| 2017/0075889 | A1 | 3/2017 | Mahkovec |
| 2017/0371845 | A1 | 12/2017 | Ragan |
| 2018/0143947 | A1* | 5/2018 | Jain ....................... G06F 40/106 |
| 2018/0267691 | A1* | 9/2018 | Mattsson ............ G06F 3/04812 |
| 2018/0285430 | A1* | 10/2018 | Mehta ..................... G06F 16/27 |
| 2019/0050420 | A1* | 2/2019 | Miranda-Steiner ... G06F 16/178 |
| 2019/0065509 | A1 | 2/2019 | Liu |
| 2019/0188188 | A1 | 6/2019 | Kottomtharayil |
| 2019/0332231 | A1 | 10/2019 | Rogers |
| 2020/0201818 | A1 | 6/2020 | Khajuria |

FOREIGN PATENT DOCUMENTS

| | | |
|---|---|---|
| CN | 111143298 A | 5/2020 |
| KR | 101779308 B1 | 9/2017 |
| KR | 101993017 B1 | 6/2019 |

OTHER PUBLICATIONS

Federal Agencies Digitalization Guidelines Initiative, "Term: Metadata, embedded", www.digitalizationguidelines.gov/term.php?term=metadataembedded, Sep. 17, 2021, p. 1.

Finances On Line, "71 Cloud file and Document Management Statistics You Must Know: 2022021 Data Analysis Market Share", http://financesonline.com/cloud-file-document-management-statistics/, Sep. 17, 2021, pp. 1-18.

Financesonline, "64 Significant Cloud Computing Statistics for 2021: Usage, Adoption & Challenges", https://financesonline.com/cloud-computing-statistics, Sep. 17, 2021, pp. 1-18.

Frost, "Forget Folders: The Best Ways to Organize Your Files with Tags and Labels", Zapier, Jun. 4, 2019, pp. 1-13.

Hahn, "Embedding Metadata to a WAV file", Gearspace.com, http://gearspace.com/board/msic-computers/1232305-embedding-metadata-wav-file.html, Sep. 17, 2021, pp. 1-5.

IPTC, "Embedded Metadata Manifesto", IPTC—International Press Telecommunications Council, www.embeddedmetadata.org, 2021, p. 1.

Linux, "How do you overwrite the contents of a file without changing the file size?", http://www.linuxquestions.org/questions/linux-software-2/how-do-you, accessed Sep. 17, 2021, pp. 1-3.

Mell et al., "The NIST Definition of Cloud Computing", National Institute of Standards and Technology, Special Publication 800-145, Sep. 2011, pp. 1-7.

Melton, "Embedded Metadata", ScienceDirect, http://www.sciencedirect.com/topics/computer-science/embedded-metadata, accessed Sep. 17, 2021, pp. 1-30.

Robinson et al, "Mouse-over File Browsing System", ip.com No. IPCOM000180881D, Mar. 19, 2009, pp. 1-6.

Stackoverflow, "Java insert bytes to file at given position without overwriting any data", http://stackoverflow.com/questions/49442299/java-insert-bytes-to-file-at-given-position-without-overwriting-any-data, accessed Sep. 17, 2021, pp. 1-3.

Trust Radius, "Cloud Storage Software Statistics and Trends", http://www.trustradius.com/venor-blog/cloud-storage-statistics-and-trends, Jun. 9, 2020, pp. 1-15.

International Search Report and Written Opinion for PCT/CN2022/120872, International Filing Date, Sep. 23, 2022, dated Nov. 30, 2022, 9 pages.

* cited by examiner

1

REALTIME VIEWER IN CLOUD STORAGE ENVIRONMENTS

BACKGROUND

The exemplary embodiments relate generally to user interfaces, and more particularly to a realtime viewer of content in cloud storage environments that represents the content to a user in a resource efficient manner.

There is a plurality of platforms providing cloud services. There is also a plurality of types of cloud services that are offered to users. For example, the platforms may provide a cloud service of cloud storage in which users may independently and/or collaboratively store data in the cloud for access thereto. The data may be stored as files including respective content. Through the cloud storage service, users may share information in different formats and collaborate with other users around the world. Each platform may utilize a respective user interface for users to navigate the files that are associated and stored in the cloud storage service. The user interface may allow the user to store the files in the cloud storage service in various manners. For example, the user may be provided one or more folders in which the files may be stored. Each folder may also include sub-folders in one or more levels to further organize the files. With an increasing amount of files being stored in the cloud storage service that may further be organized in multiple folders and sub-folders, the one or more users may be incapable of identifying or locating the exact file to be found such as when a file name is unknown, the content of the files have been modified by the user or another user (e.g., data in one file is moved into a different, unknown file), the file name being known but the folder location is unknown, etc.

SUMMARY

The exemplary embodiments disclose a method, a computer program product, and a computer system for generating a realtime viewer of content in a user interface for cloud storage environments. The method comprises receiving an input selecting a data unit stored with a cloud storage service. The method comprises transmitting a sensory representation to a user device. The sensory representation is shown on the user interface of the user device. The sensory representation is generated prior to the input is received. The sensory representation is output to a user utilizing the user device such that the user is capable of ascertaining a content of the data unit without the user requesting the data unit.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
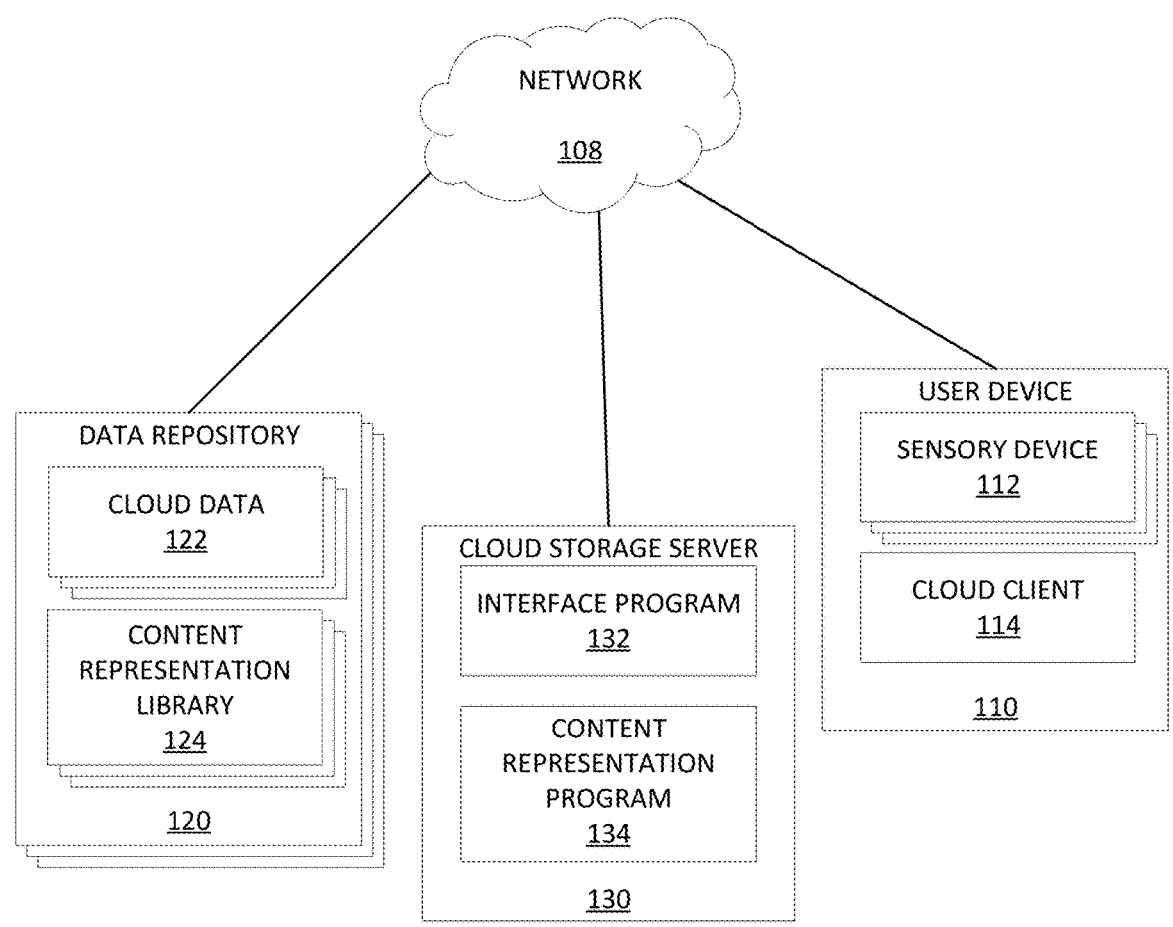
FIG. 1 depicts an exemplary schematic diagram of a realtime viewer system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for generating a realtime viewer of content in a user interface for cloud storage environments. The exemplary embodiments may generate the realtime viewer of the content such that the exemplary embodiments prepare and provide a sensory representation of the content to a user navigating data in a cloud storage environment. The sensory representation may provide a visual and/or audio representation that indicates content in a given data unit to the user. According to the exemplary embodiments, the sensory representation may allow the user to ascertain the content of the data unit via a constructive accessing of the data unit. Key benefits of the exemplary embodiments may include increasing an efficiency and usability of cloud storage platforms as well as reducing overall overhead caused on cloud resources from users navigating and accessing data units to determine the content of those data units. Detailed implementation of the exemplary embodiments follows.

A cloud may allow users to utilize a variety of different cloud services including cloud storage services where a user may store data in the cloud without the need for a personal hardware storage unit configured for such a purpose. The cloud storage service also enables the user to access the data stored in the cloud in any location where the cloud may be accessed (e.g., via a network connection). There are multiple platforms that provide a respective cloud and corresponding accompanying cloud storage services. Through the platform and the tools thereof, users may share data in different formats and collaborate with other users who have access to the cloud in which the data is stored.

Many users utilize these cloud storage services to store data and share information with collaborators. However, in storing this data, the users accessing a common set of data on the cloud may get lost by the vast number of different data units within the common set. The data unit may be individual files and/or folders storing a set of files and/or sub-folders. The complexity of locating a data unit may be further increased by the great variety of documents and individualized syntax for naming files, making it difficult and slow to identify a specific record or data unit. Even within a single user, this variety may be relatively large which is only compounded when considering a plurality of users. In many cases, a user may want to find specific information within a data unit (e.g., a file) but the name of the data unit may be unknown or modified. Searching for the specific data unit within the cloud storage service may therefore be an unfriendly task that requires investing more time than desired. From the perspective of the platform providing the cloud storage service, the user navigating the data and accessing numerous data units unnecessarily increases the cloud resources. When multiple users perform such navigation with access to more and more data units (e.g., requesting the data unit to open and view), the platform may be required to expend a larger amount of cloud resources to accommodate these actions.

When users utilizing cloud storage services are surveyed, the users have noted a plurality of issues. For example, a vast majority of the users have admitted that data units (e.g., documents) that cannot be located are recreated. Such a result increases cloud resources (e.g., a redundant data unit is now being stored) and wastes the user's time. In another example, a large portion of the users have stated that the process of locating a data unit (e.g., when the specific location and/or name of the data unit is unknown) is time-consuming and challenging. In a further example, a large portion of the users have indicated that data units are often not named or labelled correctly which may lead to such data units being skipped or omitted from consideration. In yet another example, a large portion of the users have noted that data units are sometimes saved in the wrong folder or system.

Conventional approaches have provided a variety of mechanisms for previewing data. For example, conventional approaches have been proposed where a preview of a file is created when requested. In one conventional approach, a user is provided an estimate time to process the file for the preview to be created. In another conventional approach, a selected file may provide details of activities as performed by collaborators. In a further conventional approach, each file may be identified by using the content item itself as a hash key in a hashing algorithm. In yet another conventional approach, the preview of a file may be created ad hoc where the platform providing the cloud storage service opens the selected file and created the preview that is subsequently shown to the user. However, in each of these conventional approaches, a sensory representation of the data unit is never provided in a manner that allows a user to receive the sensory information from the sensory representation and identify the data unit based on this sensory information. Furthermore, when a preview is provided, the conventional approaches require the data unit itself to be accessed, downloaded, and/or opened by at least one component, whether the user's device or the platform providing the service.

The exemplary embodiments are configured to generate and provide a sensory representation of a data unit that enables a user to identify and locate a desired data unit when the location and/or name is unknown. In situations where the user does not remember or does not know the name or location of a data unit on a cloud storage service, the exemplary embodiments may aid the user to efficiently identify the data unit by constructively showing the content of a selected data unit without accessing and/or opening the data unit by the user or the cloud platform, without requiring the user to download the data unit, without requiring the user to request the data unit in a direct manner (e.g., the user manually enters a request for the data unit to ascertain its content) or indirect manner (e.g., the user may select a data unit which triggers operations to open and/or access the data unit for its content to be indicated to the user), etc. In this manner, the exemplary embodiments increase the usability of the cloud storage service while also reducing overhead caused on the cloud resources by users being required to navigate through multiple folders and files as well as request and download files to find a desired data unit. Without the exemplary embodiments, each instance that a user opens a folder will require consumption of cloud resources. Going back to a root folder also means repetitively loading all the folders which also increase the consumption of cloud resources. As will be described in further detail below, the exemplary embodiments may generate and provide a smart view of the name and documents contained in a folder, a smart view of selected portions of content of a file, and/or a smart output of an audio explanation of a data unit.

The exemplary embodiments are described with particular reference to cloud storage services in which a content of data stored in a cloud is described via sensory representations. However, the exemplary embodiments may be utilized and/or modified for further environments. For example, the exemplary embodiments may also be utilized for navigation on operating systems.

FIG. 1 depicts a realtime viewer system 100, in accordance with the exemplary embodiments. According to the exemplary embodiments, the realtime viewer system 100 may include a user device 110, one or more data repositories 120, and a cloud storage server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

Initially, it is noted that the realtime viewer system 100 shows the components thereof in an illustrative and/or constructive manner. As the exemplary embodiments are directed toward a cloud architecture, those skilled in the art will understand the representation of the data repositories 120 as illustrated in FIG. 1 and though such a representation may be one implementation in the cloud, other implementations are also capable of being utilized by the realtime viewer system 100. Further descriptions, implementations, and embodiments of a cloud architecture are described in detail below, with particular regard to FIG. 7.

In the exemplary embodiments, the network 108 may be a communication channel capable of transferring data between connected devices. Accordingly, the components of the realtime viewer system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the realtime viewer system 100 that do not utilize the network 108.

In the exemplary embodiments, the user device 110 may include one or more sensory devices 112 and a cloud client 114, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the user device 110 is shown as a single device, in other embodiments, the user device 110 may be comprised of a cluster or plurality of computing devices, in a modular manner, etc., working together or working independently. The user device 110 is described in greater detail as a hardware implementation with reference to FIG. 6 (e.g., data processing according to the exemplary embodiments being performed by processor 02), as part of a cloud implementation with reference to FIG. 7 (e.g., the device 110 according to the exemplary embodiments being represented by the laptop computer 54C), and/or as utilizing functional abstraction layers for processing with reference to FIG. 8 (e.g., workload layer 90 including realtime viewer generation processing 96 according to the exemplary embodiments). The user device 110 may be utilized by a user attempting to locate a data unit in a cloud storage service, particularly when a name and/or location of the data unit is unknown or modified.

In the exemplary embodiments, the one or more sensory device 112 may generate sensory outputs to the user navigating the data stored with the cloud storage service. For example, the sensory device 112 may include a display device (e.g., a monitor, a touchscreen, etc.). The display device may be any device configured to show information to a user. In another example, the sensory device 112 may include an audio output device (e.g., a speaker, headphones, etc.). The audio output device may be any device configured to output audio that is played back for the user.

The sensory device 112 may also receive sensory outputs from the user navigating the data stored with the cloud storage service. For example, the sensory device 112 may include any input device (e.g., keyboard, mouse, etc.) that allows the user to enter an input that may be used to select a data unit while navigating the data stored with the cloud storage service. In another example, the sensory device 112 may include an audio input device (e.g., a microphone). The audio input device may be any device configured to receive spoken audio from the user that may be recorded for subsequent processing.

In the exemplary embodiments, the cloud client 114 may act as a client in a client-server relationship and may be a software, hardware, and/or firmware based application capable of displaying data units for data stored with the cloud storage service via the network 108. In embodiments, the cloud client 114 may provide a user interface in which the user may navigate the data as well as interact with one or more components of the realtime viewer system 100, and utilize various wired and/or wireless connection protocols for data transmission and exchange associated with data used for modifying a version of an application, including Bluetooth, 2.4 gHz and 5 gHz internet, near-field communication, Z-Wave, Zigbee, etc.

As noted above, a data unit may represent a file (e.g., a document), a folder, a sub-folder, etc. As one skilled in the art will reasonably understand, a file may be any single resource in which data is recorded; a folder may be any directory in which one or more files may be catalogued; and a sub-folder may be any sub-directory within a parent folder. The data unit as described in the exemplary embodiments may refer to any of these types. When the exemplary embodiments are directed to a particular type of data unit, the appropriate type will be referred to in the description.

As will be described in detail below, the cloud client 114 may allow a user to access data stored with the cloud storage service on the platform providing the cloud storage service. For example, a network connection may be established between the user device 110 and the platform. A subsequent login procedure may be performed to identify the data associated with a given user and/or permissions for such data, with particular regard to accessing the data (e.g., a shared drive on the cloud may include a vast number of files but the user may only be permitted to view and/or access a subset of these files). The cloud client 114 may generate the user interface in which the user may navigate this data. According to the exemplary embodiments, the cloud client 114 may also receive a sensory representation of a selected data unit that provides a sensory output (e.g., a visual representation or an audio representation) of the content of the selected data unit. The cloud client 114 may therefore generate an output corresponding to the sensory representation.

In the exemplary embodiments, the data repository 120 may include one or more cloud data 122 and one or more content representation libraries 124 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the data repository 120 is shown as a single device, in other embodiments, the data repository 120 may be comprised of a cluster or plurality of electronic devices, in a modular manner, etc., working together or working independently. While the data repository 120 is also shown as a separate component, in other embodiments, the data repository 120 may be incorporated with one or more of the other components of the realtime viewer system 100. For example, the data repository 120 may be incorporated in the cloud storage server 130. Thus, access to the data repository 120 by the cloud storage server 130 may be performed locally. The data repository 120 is described in greater detail as a hardware implementation with reference to FIG. 6, as part of a cloud implementation with reference to FIG. 7, and/or as utilizing functional abstraction layers for processing with reference to FIG. 8. As noted above, the exemplary embodiments are directed toward cloud architectures and cloud storage services and the illustration in FIG. 1 is only a constructive representation of components that may be involved in the features of the exemplary embodiments.

In the exemplary embodiments, the cloud data 122 may be any type of data in any format that a user may store using the cloud storage service. The cloud data 122 may be stored in one or more storage media that a platform may utilize to provide the cloud storage service. Accordingly, the cloud data 122 may be stored in one or more locations where the storage media may be physically located. However, when accessed, the cloud data 122 associated with a user may be provided through the user interface of the cloud client 114.

In the exemplary embodiments, the content representation library 124 may include a plurality of sensory representations for data units stored with the cloud storage service. As will be described in detail below, the sensory representations may include visual representations and audio representations that indicate the content of a data unit (e.g., a file, a folder, etc.). The visual representation may be an image or a series of images in a static or interactive manner. The audio representation may be a recorded sound file or an artificially generated sound based on a received input (e.g., a written statement).

The data repository 120 including the content representation library 124 is only for illustrative purposes. As will be described in further detail below, the sensory representations may be stored in a variety of manners and in a variety of locations. Accordingly, based on the particular mechanism to be employed, the data repository 120 may not include a separate content representation library 124. For example, the sensory representation may be stored as metadata or in empty spaces of the data unit itself.

In the exemplary embodiments, the cloud storage server 130 may include an interface program 132 and a content representation program 134, and act as a server in a client-server relationship with the cloud client 114 as well as be in a communicative relationship with the data repository 120. The cloud storage server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the cloud storage server 130 is shown as a single device, in other embodiments, the cloud storage server 130 may be comprised of a cluster or plurality of computing devices, working together or working independently. While the cloud storage server 130 is also shown as a separate component, in other embodiments, the operations and features of the cloud storage server 130 may be incorporated with one or more of the other components of the realtime viewer system 100. The cloud storage server 130 is described in greater detail as a hardware implementation with reference to FIG. 6 (e.g., data processing according to the exemplary embodiments being performed by processor 02), as part of a cloud implementation with reference to FIG. 7 (e.g., the server 130 according to the exemplary embodiments being represented by the desktop computer 54B), and/or as utilizing functional abstraction layers for processing with reference to FIG. 8 (e.g., workload layer 90 including realtime viewer generation processing 96 according to the exemplary embodiments).

In the exemplary embodiments, the interface program 132 may be a software, hardware, and/or firmware application configured to receive requests to access data stored with the cloud storage service from the cloud client 114 of the user device 110. The interface program 132 may transmit data corresponding to this data such that a user interface may be generated on a display device (e.g., sensory device 112) of the user device 110. As a result of a selection being made and a corresponding request to receive the data of the selection, the cloud storage server 130 may transmit the data to the user device 110.

The interface program 132 may also be configured to cooperate with the content representation program 134 such that the user interface may provide a sensory representation when the user selects to receive the sensory representation to identify the content of the selected data unit. As will be described in further detail below with regard to the content representation program 134, the interface program 132 may provide the corresponding information to the cloud client 114 such that the user may view visual representations and/or hear a playback of audio representations.

In the exemplary embodiments, the content representation program 134 may be a software, hardware, and/or firmware application configured to generate a sensory representation and store the sensory representation such that a request to ascertain content of a data unit may enable the sensory representation to be provided to the user over the user interface on the cloud client 114 of the user device 110. The content representation program 134 may generate the sensory representation to enable the user to ascertain the content of the data unit without requiring the platform (e.g., the cloud storage server 130) to open the data unit nor requiring the user to actively navigate or download the data unit. Instead, the content representation program 134 may generate the sensory representation for the user to constructively access the data unit and identify the content thereof.

The exemplary embodiments may provide a friendly mechanism that simplifies a process in which a user attempts to identify files and folders stored with the cloud storage service without the need to open or download the file or folder. The exemplary embodiments also provide this feature without the platform providing the cloud storage service to open the file or folder but instead access only a sensory representation of the file or folder. As will be described in detail below, the mechanism according to the exemplary embodiments utilizes an intelligent system that optimizes the usability of the cloud by enabling the viewing of files and folders without requiring an actual access (e.g., opening, downloading, etc.) thereto.

As noted above, a data unit may refer to a file or a folder. With particular regard to a folder, the exemplary embodiments may generate the sensory representation as a visual representation in a smart view where each file and sub-folder contained in the folder is shown in an image. Other information of the files in the folder may be shown as well such as a name, a type of document, a creation date, a last modified date, etc. The image of the content of a folder may also be interactive such that the user may further interact with the image to show additional information or further sensory representations. For example, the user may view the smart view of a folder which includes a sub-folder. The user may select to view a further smart view of the sub-folder by selecting the sub-folder in the image of the sensory representation. With particular regard to a file, the exemplary embodiments may generate the sensory representation with a visual identification of the content of the particular file. For example, a snapshot of one or more portions of the file may be selected as a visual representation (e.g., select pages in a document, select frames in a video or image set, etc.). The snapshot may be shown in a mini-video format (e.g., gif format). The visual representation may enable the content to be visualized or indicated through various input mechanisms. For example, a user may use an input device and select an icon corresponding to a data unit (e.g., hover a mouse pointer over the data unit, click a mouse on the data unit, etc.). The exemplary embodiments may generate, for example, a floating informational bubble that displays the content of the data unit as the sensory representation.

A data unit may also have a further type of sensory representation to describe or indicate the content of the data unit. For example, the exemplary embodiments may generate an audio representation such as a sound tag in which a voiced description may be played back for the user. The audio representation may be utilized for a file and a folder. For example, with a folder, the audio representation may indicate a commonality among the files in the folder (e.g., "This folder has the drafts of the ideas not submitted"). With a file, the audio representation may indicate the content (e.g., "This is the Thesis reviewed on May 14.").

Figure 2:
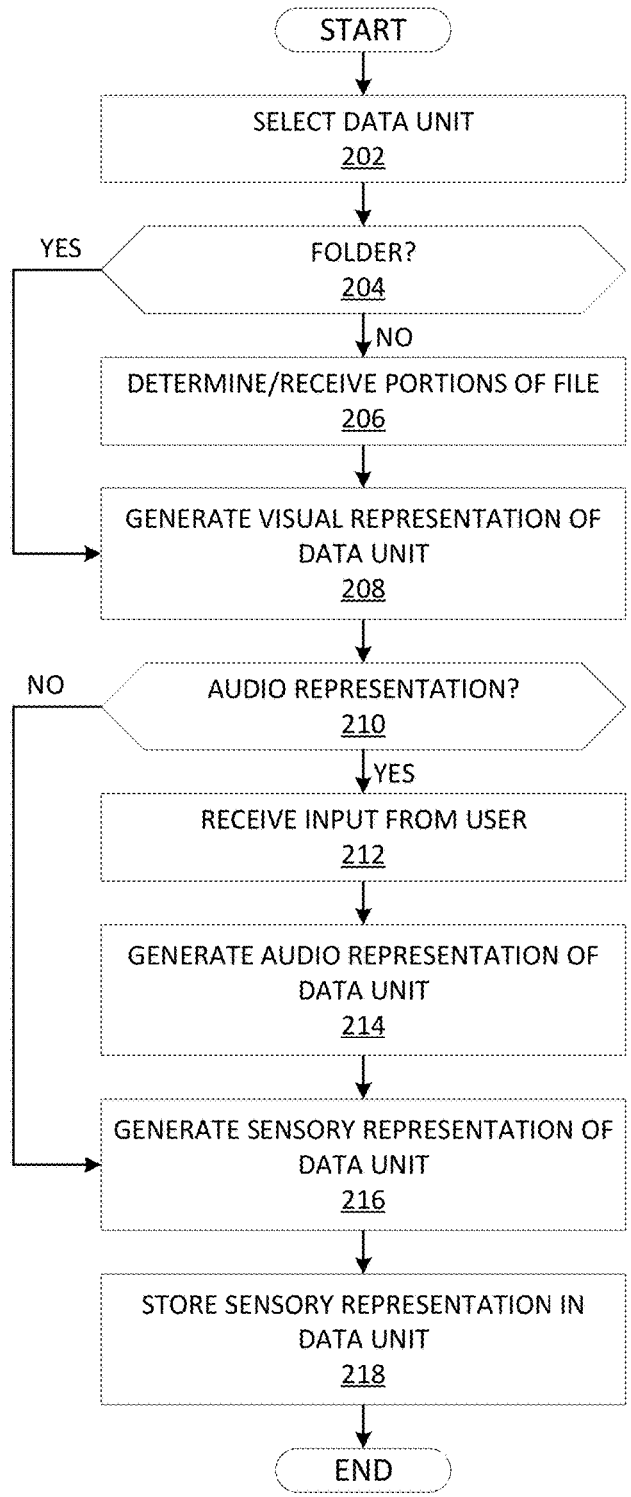
FIG. 2 depicts an exemplary flowchart of a method illustrating the operations of a cloud storage server 130 of the realtime viewer system 100 in generating a sensory representation for a data unit, in accordance with the exemplary embodiments.

FIG. 2 depicts an exemplary flowchart of a method illustrating the operations of a cloud storage server 130 of the realtime viewer system 100 in generating a sensory representation for a data unit, in accordance with the exemplary embodiments. The method 200 may relate to operations that are performed by the content representation program 134. The method 200 will be described from the perspective of the cloud storage server 130.

The cloud storage server 130 may determine or receive a selection of a data unit (step 202). The cloud storage server 130 may generate the sensory representation in a variety of manners. For example, the cloud storage server 130 may generate the sensory representation at one or more different times. In an exemplary embodiment, the cloud storage server 130 may generate the sensory representation in a manual manner upon a user selecting the data unit to generate the sensory representation (e.g., a settings option with the cloud storage service where the user may select when and which data units are to have the sensory representation). In another exemplary embodiment, the cloud storage server 130 may generate the sensory representation when an event has occurred such as the creation of a new data unit, a modification of an existing data unit, the addition or deletion of a data unit, etc. Upon determining the occurrence of the event, the cloud storage server 130 may perform the operations herein. In a further exemplary embodiment, the cloud storage server 130 may generate the sensory representation at predetermined intervals or administrative events (e.g., once a day, once a week, biweekly, monthly, after maintenance of the server, etc.). In yet another exemplary embodiment, the cloud storage server 130 may utilize any combination of the above noted examples or utilize further rationales.

The cloud storage server 130 may also generate the sensory representation in a preliminary manner or a predictive manner. For example, the cloud storage server 130 may preliminarily prepare the sensory representations such that the sensory representation is ready for display at any moment. In another example, the cloud storage server 130 may predictively prepare the sensory representations such that a user's current location within the directory of the data stored with the cloud storage service may indicate a potential selection. The cloud storage server 130 may thereby generate the sensory representations that are potential selections. For example, in a given folder, there may be sub-folders and files. With the current directory of the folder open, the cloud storage server 130 may predict that one of the sub-folders and/or the files therein may be selected. The cloud storage server 130 may generate the sensory representations of these potential data units in a predictive manner. Whether the cloud storage server 130 generates the sensory representation in a preliminary or predictive manner, the cloud storage server 130 may have the sensory representation generated and/or prepared prior to a data unit being selected in which the sensory representation is to be provided. In this manner, the sensory representation alone may allow the user to ascertain the content of the data unit without a request for the data unit or the platform providing the cloud storage service from accessing/opening the data unit to generate the sensory representation.

For the selected data unit, the cloud storage server 130 may determine whether the data unit is a folder or a file (decision 204). Again, a data unit may refer to a folder or a file within a directory of the data stored with the cloud storage service. As a result of the data unit being a folder (decision 204, "YES" branch), the cloud storage server 130 may generate the sensory representation with operations designed for a folder. As a result of the data unit being a file (decision 204, "NO" branch), the cloud storage server 130 may generate the sensory representation with operations designed for a file.

With regard to a file (decision 204, "NO" branch), the cloud storage server 130 may determine or receive portions of the file that will be used in a representative capacity to indicate the content of the file (step 206). When the file is a document, presentation, etc., the file may include one or more pages. When the file is an image, a series of images, a video, etc., the file may include one or more frames. Thus, for documents, the portions may be one or more pages while for images, the portions may be one or more frames. Based on the type of file, the cloud storage server 130 may determine select portions of the file that may be used in generating the sensory representation. The user may also select the portions of the file and manually provide the inputs to the cloud storage server 130. The cloud storage server 130 may also recommend select portions of the file from which the user may accept or decline or request further select portions. The cloud storage server 130 may determine or recommend the select portions using various mechanisms.

For example, the cloud storage server 130 may always select the first page, frame, etc. In another example, the cloud storage server 130 may randomly select pages, frames, etc. In a further example, the cloud storage server 130 may be configured with a content analysis mechanism such as through various modeling techniques, neural networks (e.g., CNN, RNN, etc.), etc. as one skilled in the art would understand. Using the content analysis of the file, the cloud storage server 130 may identify pages, frames, etc. that may have a higher confidence of being indicative of the content of the file.

For the data unit being a folder or a file, the cloud storage server 130 may generate the sensory representation as a visual representation of the data unit (step 208). As described above, the visual representation may be an implementation of the sensory representation in which a user may view a snapshot, image, or series of images that indicate the content of the data unit. Based on whether the data unit is a folder or a file, the cloud storage server 130 may generate the visual representation using corresponding operations.

Figure 4:
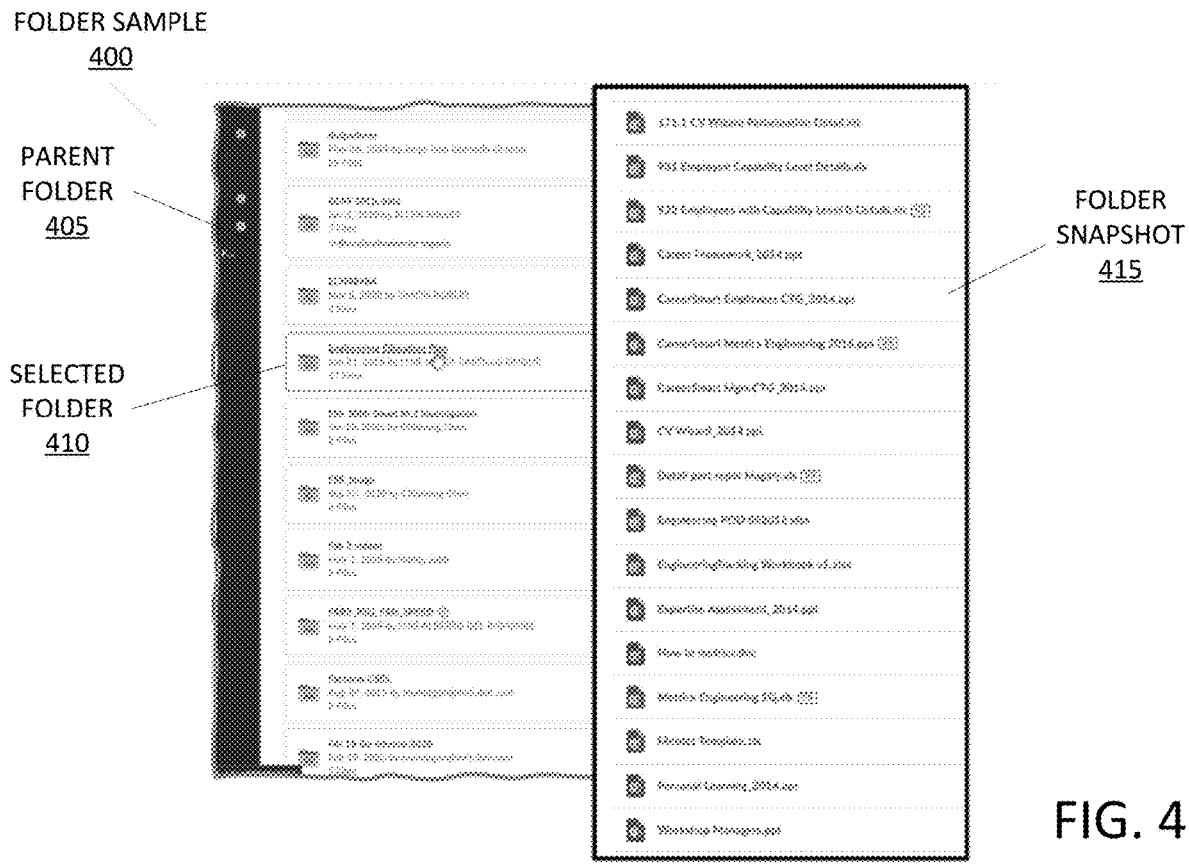
FIG. 4 depicts an exemplary visual representation of a folder, in accordance with the exemplary embodiments.

With regard to a folder, the cloud storage server 130 may take a snapshot or an image of the files and sub-folders that are contained in the folder. FIG. 4 depicts an exemplary visual representation of a folder, in accordance with the exemplary embodiments. The visual representation of the folder shown in folder sample 400 illustrates a resulting snapshot of sub-folders and files contained therein. As illustrated, the user interface provided by the cloud client 114 may enable the user to navigate through a directory of the data stored with the cloud storage service. As shown, within the directory, there may be a parent folder 405. Within the parent folder 405, there may be a plurality of folders such as a selected folder 410 as well as files (not shown). The cloud storage server 130 may capture a snapshot of the sub-folders and/or files that are contained in the folder 410. Thus, for the selected folder 410, the cloud storage server 130 may capture a folder snapshot 415 that shows the files and/or sub-folders therein. The cloud storage server 130 may also consider an available display area of the display device of the user device 110. Accordingly, in generating the folder snapshot 415, the cloud storage server 130 may include various features such as a resizing of the folder snapshot 415 to show an entirety of the sub-folders and/or files of the selected folder 410, a scrolling option when the folder snapshot 415 only shows a subset of the sub-folders and/or files of the selected folder 410, etc. the cloud storage server 130 may also generate the visual representation (e.g., the snapshot such as the folder snapshot 415) in a static manner or an interactive manner. In the static manner, the cloud storage server 130 may generate the folder snapshot 415 to enable the user to view the items (e.g., sub-folders and/or files) contained in the selected folder 410. In the interactive manner, the cloud storage server 130 may generate the folder snapshot 415 such that each item of the folder snapshot 415 may be further selected for a further sensory representation to be output.

Figure 5:
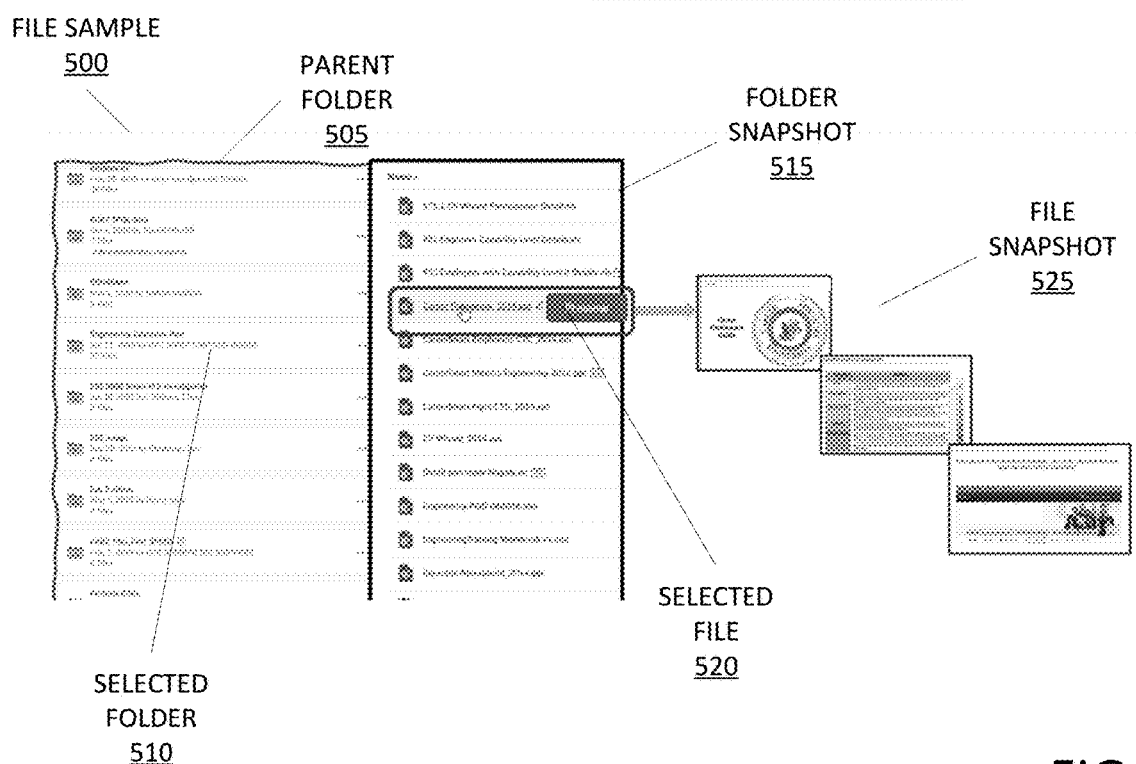
FIG. 5 depicts an exemplary visual representation of a file, in accordance with the exemplary embodiments.

With regard to a file, the cloud storage server 130 may utilize the determined or received portions of the file (e.g., step 206). FIG. 5 depicts an exemplary visual representation of a file, in accordance with the exemplary embodiments. The visual representation of the file shown in file sample 500 illustrates a resulting snapshot of content of a selected file. As illustrated, within a parent folder 505, there may be a plurality of folders such as selected folder 510 as well as files (not shown). In a manner described above, the cloud storage server 130 may have generated a folder snapshot 515 of the selected folder 510. The cloud storage server 130 may have also generated the folder snapshot 515 in an interactive manner where the items in the folder snapshot 515 may be selected to output a further sensory representation. For example, the folder snapshot 515 may include a selected file 520. The cloud storage server 130 may generate the visual representation of the selected file 520 using determined or selected portions of the selected file 520. The cloud storage server 130 may generate the visual representation as a file snapshot 525. The file snapshot 525 may include a plurality of snapshots of portions of the selected file. For example, the selected file may be a presentation or a document from which the snapshots may be determined or selected pages. In another example, the selected file may be a video from which the snapshots may be determined or selected frames. The cloud storage server 130 may generate the file snapshot 525 to show the determined or selected portions over a period of time. For example, the cloud storage server 130 may limit a time for the determined or selected portions to be shown in the visual representation (e.g., at most 10 seconds). However, the cloud storage server 130 may loop the determined or selected portions for so long as the user has selected the selected file 520. The cloud storage server 130 may generate the file snapshot 525 such that each portion is shown for a substantially similar amount of time of the total time that all portions are to be shown. In this manner, the visual representation that includes a plurality of pages or frames may be shown in an animation (e.g., a .gif file).

The cloud storage server 130 may determine whether a further type of sensory representation is to be associated with the data unit (decision 210). For example, the cloud storage server 130 may also generate an audio representation for the data unit. As a result of the sensory representation including the audio representation (decision 210, "YES" branch), the cloud storage server 130 may perform corresponding operations to generate the audio representation. As a result of the sensory representation including only the visual representation (decision 210, "NO" branch), the cloud storage server 130 may continue to complete the process of generating the sensory representation.

It is noted that the sensory representation including the visual representation and optionally further including the audio representation is only exemplary. The exemplary embodiments may generate the sensory representation in other manners. For example, the sensory representation may include the audio representation and optionally further include the visual representation. In another example, the sensory representation may allow for the types of representations to be selected by the user (e.g., in a global setting to be applied for any data unit, in a local setting to be applied for a given data unit, etc.).

As a result of the sensory representation including the audio representation, the cloud storage server 130 may receive an input from the user (step 212). For example, the cloud storage server 130 may request the input from the user when an event is registered (e.g., when a data unit is added, when a data unit is modified, etc.). The user may provide the input using an appropriate type of the sensory device 112 (e.g., a keyboard to enter a textual statement, a microphone to enter a vocal statement, etc.). As a result of the input being a vocal statement, the cloud storage server 130 may record the vocal statement and create a corresponding audio representation. As a result of the input being a textual statement, the cloud storage server 130 may generate an artificial vocal statement and create a corresponding audio representation. In this manner, the audio representation may provide a personalized sound tag that a user creates and selects. The cloud storage server 130 may also include a list of available sound tags from which the user may select to include as the audio representation (e.g., system stored audio representations previously created as a standard set of audio representations from which the user may select).

In an exemplary embodiment, the cloud storage server 130 may generate the audio representation with a variety of parameters. The parameters may be predetermined and/or selected such that a resulting size of the audio representation does not exceed a maximum data size. For example, the cloud storage server 130 may set the parameters to a minimum value where the parameters still enable any user to understand a playback of the audio representation (e.g., based on an analysis of the resulting audio representation and a confidence value meeting a predetermined threshold of understanding as indicated by a general population of users or specific to the user associated with the data stored with the cloud storage service). The parameters may include a bit depth, an audio length, a sample rate, a channel setting, a bit rate, etc. A resulting data size of the audio representation may also have a maximum allowed size such that the parameters may be adjusted accordingly. The parameters may also be set to have a range or predetermined maximum value. For example, a maximum length of the audio representation may be set to ten seconds, five seconds, etc. The parameters of the audio representation will be discussed in further detail with regard to the storage of the sensory representation.

For the data unit, the cloud storage server 130 may generate the sensory representation as an audio representation of the data unit (step 214). As described above, the audio representation may be an implementation of the sensory representation in which a user may hear a playback of a vocal recording of the user, another user, or an artificial vocal rendering that indicates the content of the data unit.

Utilizing the above set of operations, the cloud storage server 130 may generate the sensory representation of the data unit to include the visual representation, the audio representation, or a combination thereof (step 216). Upon generating the sensory representation, the cloud storage server 130 may store the sensory representation of the data unit (step 218). Once stored, the cloud storage server 130 may access the sensory representation at any time that a user selects a data unit to view the content in a friendly and efficient manner that does not require accessing, opening, or downloading of the data unit itself but only requires the sensory representation to be provided.

The cloud storage server 130 may store the sensory representation in a variety of manners. As discussed above and as illustrated in FIG. 1, the data repository 120 may include the content representation library 124. Thus, in an exemplary implementation, the cloud storage server 130 may store the sensory representations separately from the data units as linked files. The cloud storage server 130 may indicate an association or linkage of the sensory representations with the respective data unit (e.g., an identification of the association stored in a header of the corresponding visual and/or audio representation). Accordingly, for the visual representation, the cloud storage server 130 may generate an image file that is associated with the data unit, and for the audio representation, the cloud storage server 130 may generate an audio file that is associated with the data unit. The image file and the audio file may be stored as a separate data file from the data unit itself.

According to another exemplary implementation, the sensory representation may be stored as part of the data unit. In an exemplary manner of storing the sensory representation in this manner, the cloud storage server 130 may include the sensory representation as metadata of the data unit. As one skilled in the art will understand, the cloud storage server 130 may generate the sensory representation as metadata if the sensory representation is created to be within a maximum data size threshold. Thus, for the visual representation, the cloud storage server 130 may utilize various compression and encoding techniques to minimize a quality while the content of the snapshots may remain visible to the user. For example, the snapshots may be saved as images that may only be several kb in size though smaller data sizes are also achievable. For the audio representation, the cloud storage server 130 may utilize various compression techniques to also minimize a data size of the resulting audio file. As noted above, the cloud storage server 130 may also limit a time duration of the audio playback of the audio representation. For example, the cloud storage server 130 may limit the audio representation to five seconds. Thus, by setting of the audio parameters (e.g., a bit depth of 8-bit, a sample rate of 44.1 kHz, a mono channel, a bit rate of 352.8 kbit/sec, etc.), the audio file may have a data size as low as 50 kb (e.g., the noted audio parameters with a three second duration may have a file size of 132.3 kb). Through further compression of this resulting audio file (e.g., achieving a 50% compression rate), the data size of the resulting audio file may be further decreased (e.g., to have a 66 kb data size). As one skilled in the art will appreciate, the audio representation having a size of this magnitude added as metadata may be performed without significantly impacting the overall data size of the data unit.

In another exemplary manner of storing the sensory representation in the data unit, the cloud storage server 130 may determine empty spaces of the data unit. Accordingly, the cloud storage server 130 may leverage these empty spaces of the data unit and embed the sensory representation therein. Through substantially similar compression techniques and mechanisms to limit a data size of the sensory representation as described above, the relatively limited empty spaces of the data unit may be filled by the data of the sensory representation. In this manner, the size of the data unit itself is not increased (e.g., noticeably increased or at all).

In generating and storing the sensory representation in the manner described above, the exemplary embodiments provide a solution that requires low bandwidth, is faster, and is more convenient. For example, in utilizing only the sensory representation that may be substantially small (e.g., 50 kb in data size), a user may not be required to download a presentation that may potentially be of a significantly larger data size (e.g., 14 Mb). Thus, the system only utilizes a fraction of the resources while still allowing a user to ascertain the content of the data unit (e.g., 500% less bandwidth use). In another example, the user may gather the file in less time and be able to understand the content faster than a conventional approach entailing requesting the data unit, spending time to download the data unit, locally opening the data unit, reviewing the content thereof, and finally ascertaining whether the requested data unit is the correct one. In a further example, a user may more easily ascertain the content of a data unit by reviewing select portions or simply listening to a vocal rendering of a statement indicating the content.

Figure 3:
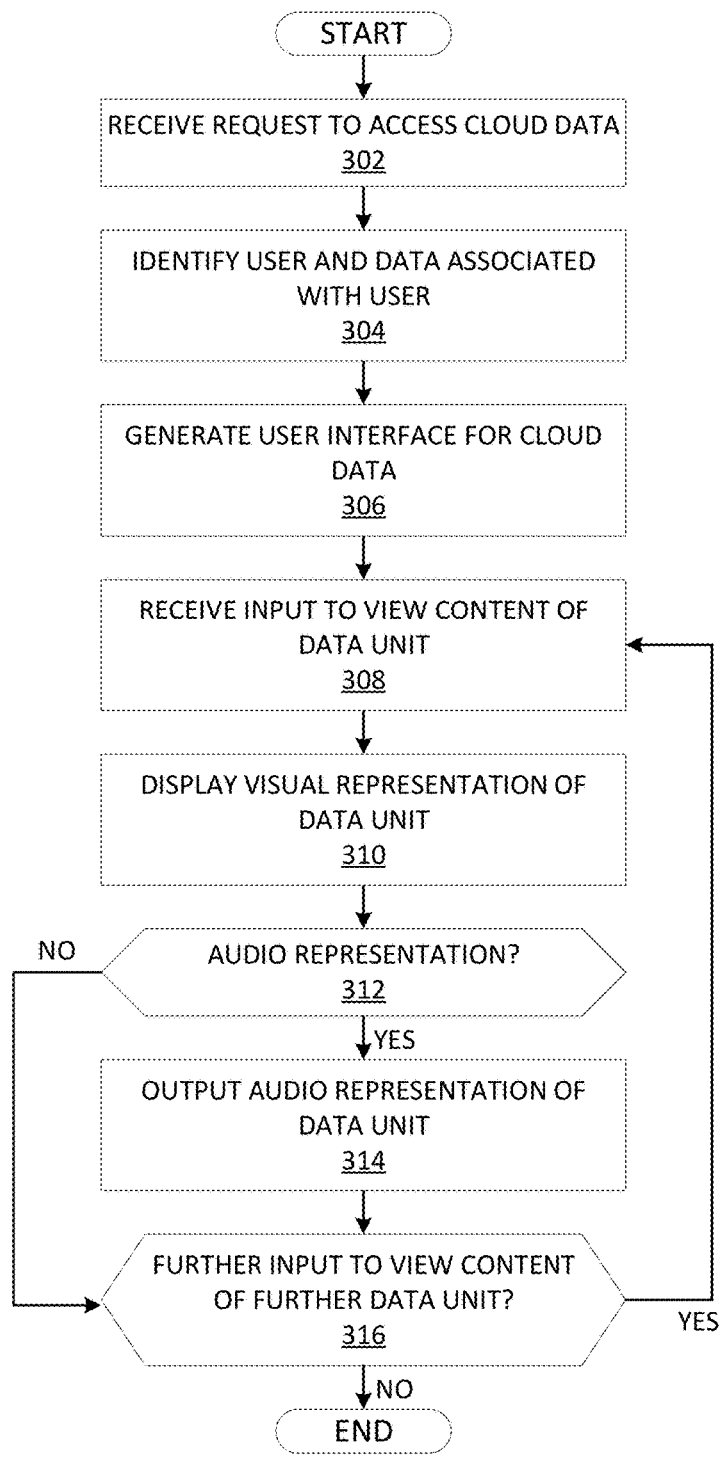
FIG. 3 depicts an exemplary flowchart of a method illustrating the operations of the cloud storage server 130 of the realtime viewer system 100 in providing a sensory representation for a data unit, in accordance with the exemplary embodiments.

FIG. 3 depicts an exemplary flowchart of a method illustrating the operations of the user device 110 and the cloud storage server 130 of the realtime viewer system 100 in providing a sensory representation for a data unit, in accordance with the exemplary embodiments. The method 300 may relate to operations that are performed by the interface program 132 and the cloud client 114.

The cloud storage server 130 may receive a request to access data stored with the cloud storage service (step 302). For example, the user may utilize the cloud client 114 on the user device 110. Upon launching the cloud client 114, the user device 110 and the cloud storage server 130 may establish a connection over the network 108. The launching of the cloud client 114 may correspond to the request to access the data stored with the cloud storage service. The cloud storage server 130 may identify the user and the data associated with the user (step 304). For example, the user may be prompted to provide credentials (e.g., login and password) to log into the cloud storage service. In another example, the cloud client 114 may have stored credential information that is exchanged upon connecting with the cloud storage server 130. The cloud storage server 130 may utilize this information to identify the user and to also determine the data that the user may access on the cloud.

As a result of determining the data stored with the cloud storage service for which the user has permission to view and/or access, the cloud storage server 130 may provide data to the cloud client 114 such that the cloud client 114 may generate a user interface for this data stored with the cloud storage service (step 306). As described above, the user interface may be configured as a directory where the user may start at a main parent folder or a last position within the directory (e.g., at a previous login session). The user may navigate through the directory such that a current folder may include one or more sub-folders and/or one or more files. The user may select a file for a subsequent operation (e.g., download) or may select a folder to further navigate. The user interface may be designed based on a proprietary arrangement determined by the platform providing the cloud storage service. The user interface may also be designed based on a selected preference (e.g., to mimic an arrangement of an operating system installed on the user device 110).

The cloud storage server 130 may receive an input to view content of a selected data unit (step 308). Via the user interface, the user may select a data unit while navigating the directory. Those skilled in the art will understand that the user may select the data unit for various purposes. For example, the user may already know the specific file to be selected. Thus, in selecting the file, the user may wish to proceed with a known set of operations. However, in the scenario where the user does not know a name or location of a desired directory, folder, or file, the user may select a data unit and utilize the features of the exemplary embodiments to view the content in a sensory representation. In light of this, according to the exemplary embodiments, the user interface may be configured to differentiate between the various intents in selecting a data unit. The method 300 is described with regard to selecting a data unit for the purpose of viewing a sensory representation so that the user may ascertain the content of a given data unit.

The user interface may allow the user to select a data unit in a variety of manners to specifically indicate that the sensory representation is to be provided. In an exemplary embodiment, the user may utilize an input device (e.g., a mouse) to select the data unit through a received input (e.g., a left mouse button click). Thus, the cloud storage server 130 may determine that the user has selected the data unit utilizing an "on click" mechanism. In another exemplary embodiment, the user may utilize the input device to select the data unit through a positional input (e.g., moving an icon to the desired data unit without subsequent action such as a mouse click). Thus, the cloud storage server 130 may determine that the user has selected the data unit utilizing a "mouse over" mechanism. In a further exemplary embodiment, the user interface may utilize a toggle mechanism in which the user may toggle to activate or deactivate the option to utilize sensory representations. In this manner, any selection process may be used (e.g., "on click", "mouse over", etc.).

As a result of selecting the data unit for the purpose of showing the sensory representation, the cloud storage server 130 may provide information to the cloud client 114 for the cloud client 114 to display the corresponding visual representation of the selected data unit (step 310). As described above, the sensory representation may be stored in various manners. As a result of the sensory representation being stored in the data unit (e.g., as metadata, in empty spaces, etc.), the cloud storage server 130 may retrieve the visual representation stored in the data unit and provide the snapshot(s) to the cloud client 114. As a result of the sensory representation being stored in the content representation library 124, the cloud storage server 130 may determine the linkage or association with the selected data unit to determine the visual representation and provide the snapshot(s) to the cloud client 114. As noted above, providing only the sensory representation is a more efficient process than requiring the user to navigate through the folders or downloading/reviewing files. In particular, the cloud resources from the cloud storage server 130 and the time/resources of the user and the user device 110 that are required are significantly reduced. For example, a proprietary type of document may utilize a relatively large data size (e.g., 20 Mb) where downloading such a document may utilize a corresponding amount of cloud resources so that the user may review the document locally on the user device 110. However, through the exemplary embodiments, the user may ascertain the content of the data unit through a snapshot which may have a significantly smaller data size (e.g., 10 kb gif file).

The exemplary embodiments are configured to provide the visual representation in realtime. In particular, with the sensory representation being stored with a relatively small data size, any data transmission that may be used for the sensory representation to be provided to the cloud client 114 may be relatively fast. In this manner, when the user requests the sensory representation, the user may view the snapshot of the visual representation in realtime or near realtime. In this manner, the exemplary embodiments provide a realtime viewer of content via the sensory representation.

With regard to the data unit being a folder, the user may view the visual representation in a manner substantially similar to the exemplary embodiment illustrated with the folder sample 400 of FIG. 4. For example, upon a "mouse over" of the selected folder 410, the visual representation illustrated as the folder snapshot 415 may be shown to the user. Again, the visual representation may be a snapshot showing the content of a folder that does not require an actual access or opening of the selected folder 410. The user may therefore see the contents of the folder including any sub-folders and/or files contained therein. The sub-folders and files may be shown with at least a name and file type. The folder snapshot 415 may also include other pertinent information. For example, the sub-folders and files may also have descriptors of a last updated date and time, a version number, etc.

With regard to the data unit being a file, the user may view the visual representation in a manner substantially similar to the exemplary embodiment illustrated with the file sample

500 of FIG. 5. For example, upon an "on click" of the selected file 520, the visual representation illustrated as the file snapshot 525 may be shown to the user. The user may see selected portions of the file where the selected portions provide the user the capability of ascertaining the content of the file (e.g., selected pages or selected frames) without an actual access or opening of the selected file 520.

The cloud client 114 may provide the sensory representation to the user on the user interface in a variety of manners. For example, as illustrated in FIG. 4, the folder snapshot 415 may be shown adjacent a view of the parent folder 405. As illustrated in FIG. 5, the file snapshot 525 may be shown adjacent the visual representation of the selected folder 510. The user interface may also show the visual representation of the selected file 520 in a variety of manners. For example, each selected portion of the selected file 520 may be shown concurrently (e.g., as shown in FIG. 5), as an animation with each selected portion being shown in succession, as a looped animation, etc. The visual representation may be shown in other manners as well. For example, the visual representation may be shown as an overlay.

The cloud storage server 130 may determine whether the selected data unit also has an audio representation (decision 312). As described above, the data unit may include the sensory representation to include the visual representation, the audio representation, or both the visual and audio representation. Also as described above, the exemplary operations described in the method 200 of FIG. 2 is directed toward an exemplary implementation that includes the visual representation and may optionally include the audio representation. The method 300 of FIG. 3 is an extension of this exemplary implementation with regard to the outputting the sensory representation. However, it is again noted that this is only exemplary and the exemplary embodiments may include only the visual representation, only the audio representation, the audio representation with optionally include the visual representation, etc. As a result of the audio representation being absent for this data unit (decision 312, "NO" branch), the cloud storage server 130 may continue to further process the navigation of the user for the data stored with the cloud storage service (e.g., decision 316).

As a result of the audio representation being included for this data unit (decision 312, "YES" branch), the cloud storage server 130 may provide information to the cloud client 114 for the cloud client 114 to output the corresponding audio representation of selected data unit (step 314). In a manner substantially similar to the visual representation, the audio representation may also be stored in the data unit or separately therefrom. Through an audio output component of the sensory device 112 (e.g., a speaker, a headset, etc.), the user may hear a vocal statement that describes the content of the data unit (e.g., a vocal recording from the user or other user, an artificial vocal rendering based on a textual statement, etc.).

The cloud storage server 130 may determine whether the user is continuing to navigate and whether there is a further input to view the content of a further data unit (decision 316). For example, as described in the file sample 500 of FIG. 5, the user may be in viewing the content of the parent folder 505. The user may submit an input to view the sensory representation of the selected folder 510 such that the folder snapshot 515 is shown to the user where the folder snapshot 515 is the visual representation of the selected folder 510. The folder snapshot 515 may be interactive for the user to select an item of the folder snapshot 515. As shown, the user may submit an input to view the sensory representation of the selected file 520. In this manner, the user may have selected a further data unit. As a result of the user selecting a further data unit (decision 316, "YES" branch), the cloud storage server 130 performs the operations to provide the sensory representation (e.g., step 308). As a result of the user completing the navigation (decision 316, "NO" branch), the cloud storage server 130 may conclude the process or await further inputs (e.g., a request to download the selected file 520 as the user has now confirmed that the selected file 520 includes the desired content via the sensory representation).

The exemplary embodiments are configured to provide a realtime viewer of content of a data unit without the data unit being accessed, opened, downloaded, or any other manner of needing the content of the data unit itself. Through creation of a sensory representation of the content, the exemplary embodiments may allow a user to ascertain the content of a selected data unit through viewing a visual representation of the content, hearing an audio representation of the content, or a combination thereof. The sensory representations provide a mechanism that utilizes a lower bandwidth, a faster determination of content, a more convenient approach to a determination of content, and a more efficient overall process to the user and the platform providing the cloud storage service.

Figure 6:
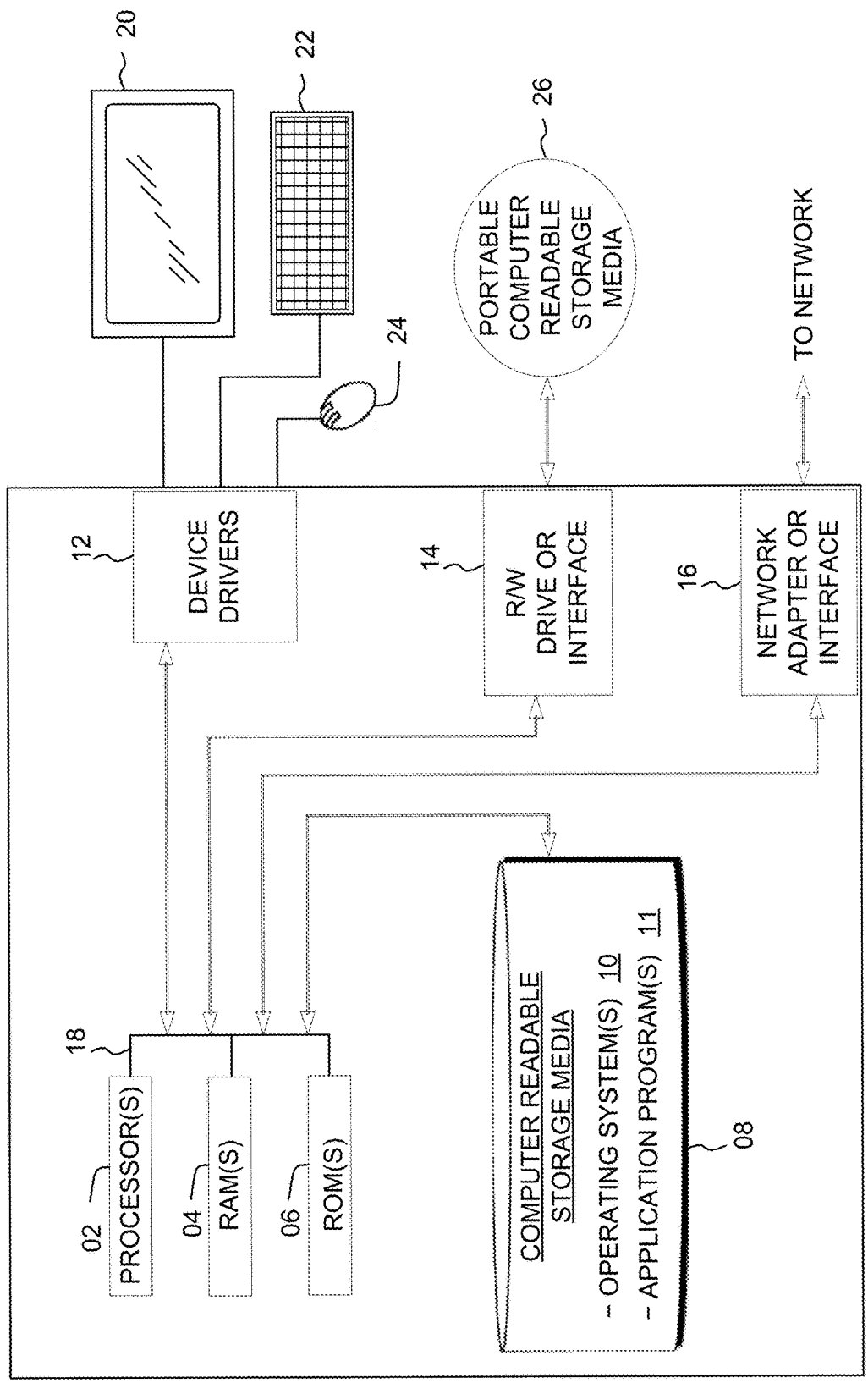
FIG. 6 depicts an exemplary block diagram depicting the hardware components of the realtime viewer system 100 of FIG. 1, in accordance with the exemplary embodiments.

FIG. 6 depicts a block diagram of devices within the realtime viewer system 100 of FIG. 1, in accordance with the exemplary embodiments. It should be appreciated that FIG. 6 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, RAY drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
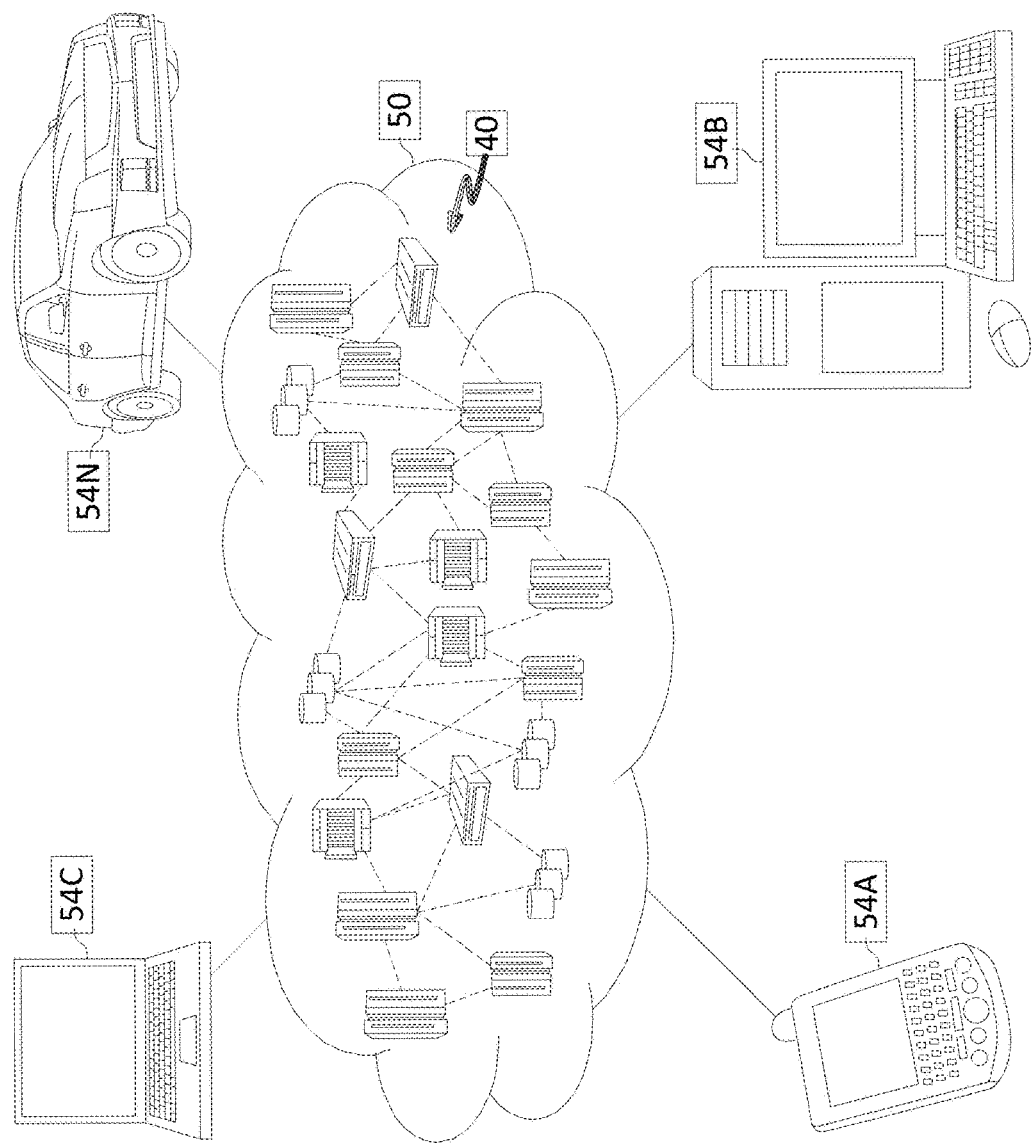
FIG. 7 depicts a cloud computing environment, in accordance with the exemplary embodiments.

Referring now to FIG. 7, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 40 and cloud computing environment 50 can communicate with any type of computerized device over any type of network and/or network addressable connection (e.g., using a web browser).

Figure 8:
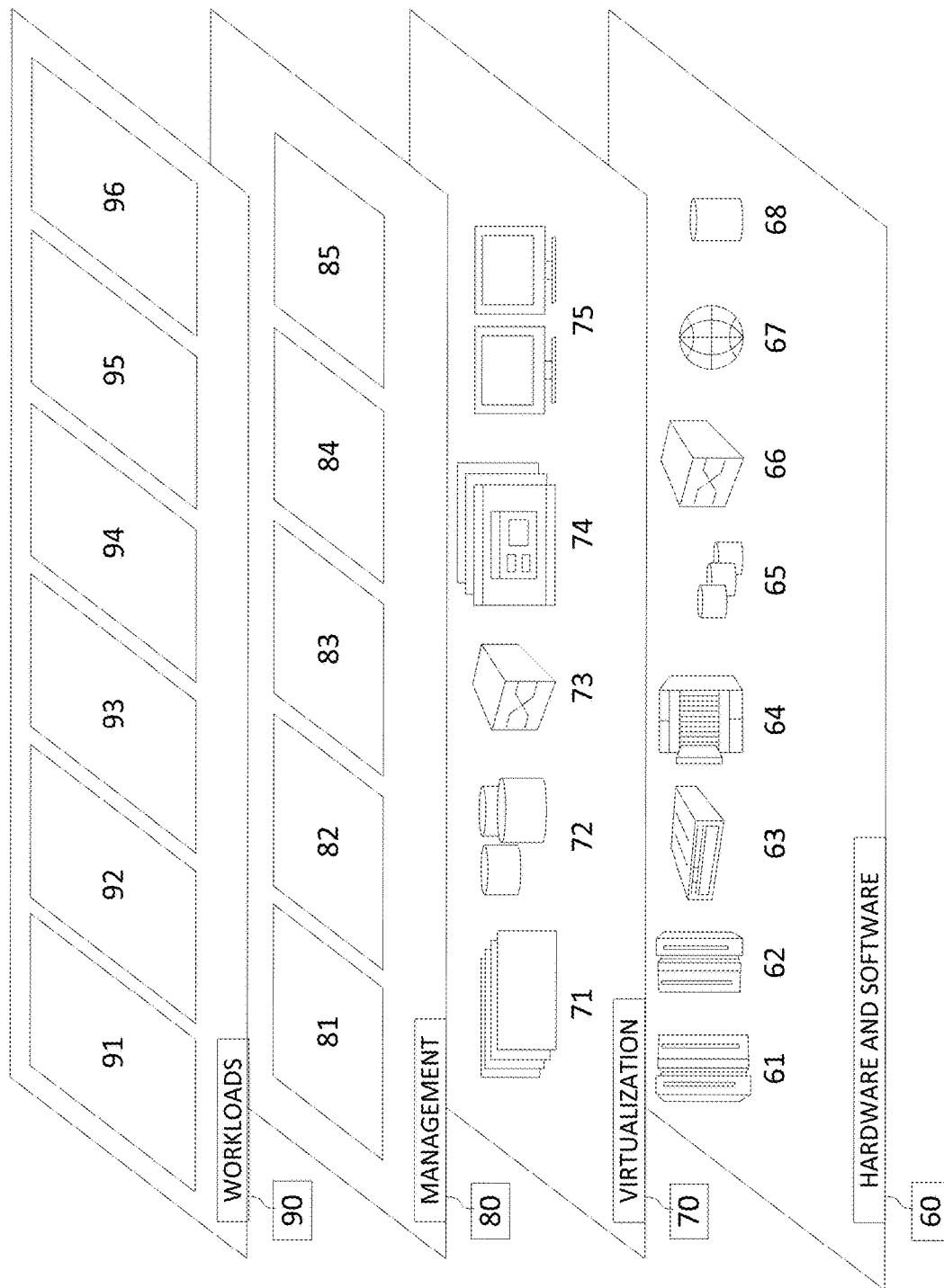
FIG. 8 depicts abstraction model layers, in accordance with the exemplary embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and realtime viewer generation processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for generating a realtime viewer of content in a user interface for cloud storage environments, the method comprising:

receiving an input selecting a data unit stored with a cloud storage service;

transmitting a sensory representation to a user device, the sensory representation being shown on the user interface of the user device, the sensory representation being generated prior to the input being received, the sensory representation being output to a user utilizing the user device such that the user is capable of ascertaining a content of the data unit without opening and downloading the data unit in realtime, wherein the data unit comprises at least one of a file and a folder, wherein the sensory representation is selected from at least one of a visual representation and an audio representation, wherein the visual representation comprises a snapshot of the content associated with the file and the folder, wherein the audio representation comprises a vocal description of the content associated with the file and the folder, wherein, in response to determining that the data unit is the file, providing, via the sensory representation, a description of the content within the file, and wherein, in response to determining that the data unit is the folder, further providing, via the sensory representation, a description of the content within the folder, wherein the sensory representation further includes the vocal description of a commonality between the content among files in the folder; and in response to determining at least one second data unit within the sensory representation of the folder, generating and presenting at least one second sensory representation for the at least one second data unit in the sensory representation such that the user is capable of ascertaining a second description of second content associated with the at least one second data unit without opening and downloading the at least one second data unit, wherein the at least one second data unit comprises at least one of a sub-folder and a different file.

2. The computer-implemented method of claim 1, wherein, as a result of the data unit being the folder, the visual representation includes one of a static or an interactive snapshot of content items stored in the folder, and wherein, as a result of the data unit being the file, the visual representation includes corresponding snapshots of selected portions of the file.

3. The computer-implemented method of claim 1, wherein the audio representation is one of a vocal recording or an artificial vocal rendering based on a textual statement.

4. The computer-implemented method of claim 1, wherein the sensory representation is stored within the data unit one of as metadata or in empty spaces of the data unit.

5. The computer-implemented method of claim 1, wherein the sensory representation is stored separately from the data unit with linkage information to the data unit.

6. A non-transitory computer-readable storage media that configures a computer to perform program instructions stored on the non-transitory computer-readable storage media for generating a realtime viewer of content in a user interface for cloud storage environments, the program instructions comprising:

receiving an input selecting a data unit stored with a cloud storage service;

transmitting a sensory representation to a user device, the sensory representation being shown on the user interface of the user device, the sensory representation being generated prior to the input being received, the sensory representation being output to a user utilizing the user device such that the user is capable of ascertaining a content of the data unit without opening and downloading the data unit in realtime, wherein the data unit comprises at least one of a file and a folder, wherein the sensory representation is selected from at least one of a visual representation and an audio representation, wherein the visual representation comprises a snapshot of the content associated with the file and the folder, wherein the audio representation comprises a vocal description of the content associated with the file and the folder, wherein, in response to determining that the data unit is the file, providing, via the sensory representation, a description of the content within the file, and wherein, in response to determining that the data unit is the folder, further providing, via the sensory representation, a description of the content within the folder, wherein the sensory representation further includes the vocal description of a commonality between the content among files in the folder; and in response to determining at least one second data unit within the sensory representation of the folder, generating and presenting at least one second sensory representation for the at least one second data unit in the sensory representation such that the user is capable of ascertaining a second description of second content associated with the at least one second data unit without opening and downloading the at least one second data unit, wherein the at least one second data unit comprises at least one of a sub-folder and a different file.

7. The non-transitory computer-readable storage media of claim 6, wherein, as a result of the data unit being the folder, the visual representation includes one of a static or an interactive snapshot of content items stored in the folder, and wherein, as a result of the data unit being the file, the visual representation includes corresponding snapshots of selected portions of the file.

8. The non-transitory computer-readable storage media of claim 6, wherein the audio representation is one of a vocal recording or an artificial vocal rendering based on a textual statement.

9. The non-transitory computer-readable storage media of claim 6, wherein the sensory representation is stored within the data unit one of as metadata or in empty spaces of the data unit.

10. The non-transitory computer-readable storage media of claim 6, wherein the sensory representation is stored separately from the data unit with linkage information to the data unit.

11. A computer system for generating a realtime viewer of content in a user interface for cloud storage environments, the computer system comprising:

one or more computer processors, one or more computer-readable storage media, and program instructions stored on the one or more of the computer-readable storage media for execution by at least one of the one or more processors capable of performing a method, the method comprising:

receiving an input selecting a data unit stored with a cloud storage service;

transmitting a sensory representation to a user device, the sensory representation being shown on the user interface of the user device, the sensory representation being generated prior to the input being received, the sensory representation being output to a user utilizing the user device such that the user is capable of ascertaining a content of the data unit without opening and downloading the data unit in realtime, wherein the data unit comprises at least one of a file and a folder, wherein the sensory representation is selected from at least one of a visual representation and an audio representation, wherein the visual representation comprises a snapshot of the content associated with the file and the folder, wherein the audio representation comprises a vocal description of the content associated with the file and the folder, wherein, in response to determining that the data unit is the file, providing, via the sensory representation, a description of the content within the file, and wherein, in response to determining that the data unit is the folder, further providing, via the sensory representation, a description of the content within the folder, wherein the sensory representation further includes the vocal description of a commonality between the content among files in the folder, and in response to determining at least one second data unit within the sensory representation of the folder, generating and presenting at least one second sensory representation for the at least one second data unit in the sensory representation such that the user is capable of ascertaining a second description of second content associated with the at least one second data unit without opening and downloading the at least one second data unit, wherein the at least one second data unit comprises at least one of a sub-folder and a different file.

12. The computer system of claim 11, wherein, as a result of the data unit being the folder, the visual representation includes one of a static or an interactive snapshot of content items stored in the folder, and wherein, as a result of the data unit being the file, the visual representation includes corresponding snapshots of selected portions of the file.

13. The computer system of claim 11, wherein the audio representation is one of a vocal recording or an artificial vocal rendering based on a textual statement.

14. The computer system of claim 11, wherein the sensory representation is stored within the data unit one of as metadata or in empty spaces of the data unit.

* * * * *